Aug. 7, 1934.　　　W. H. BASELT　　　1,969,114
CLASP BRAKE
Filed Sept. 17, 1931　　2 Sheets-Sheet 1
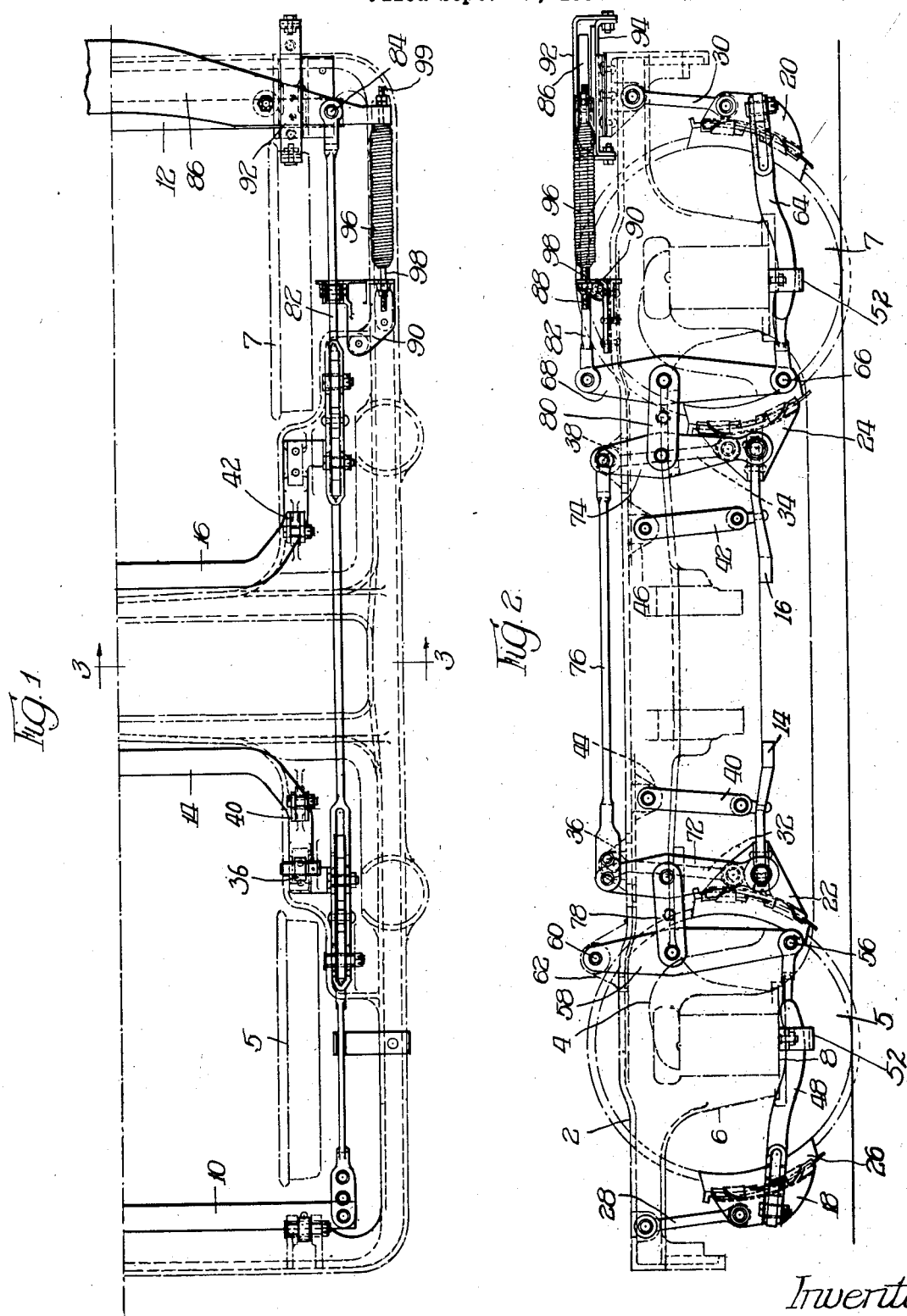
Inventor:
Walter H. Baselt,
By Wilkinson, Huxley, Byron & Knight
attys.

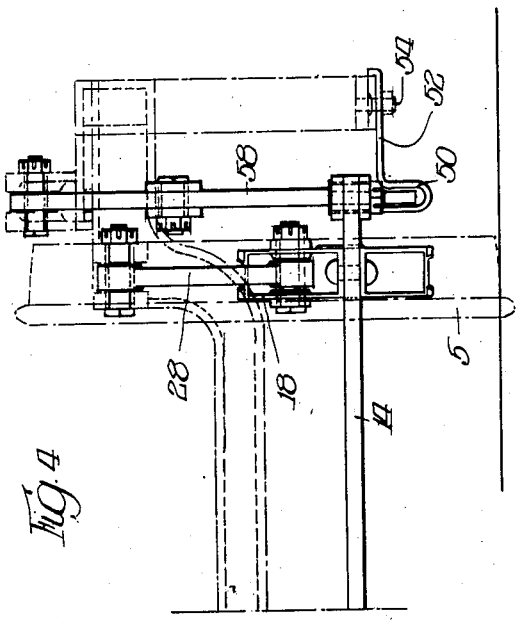
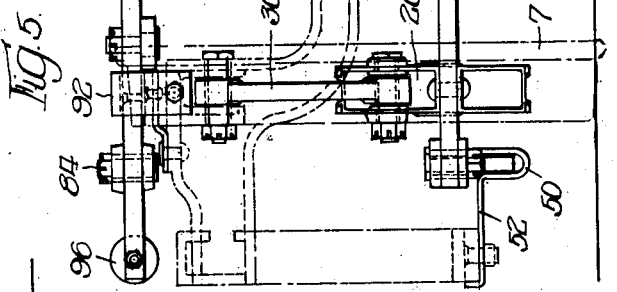
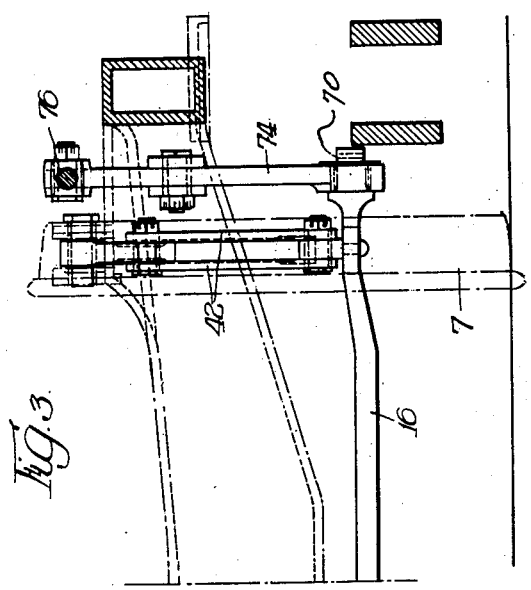

Patented Aug. 7, 1934

1,969,114

UNITED STATES PATENT OFFICE 1,969,114

CLASP BRAKE

Walter H. Baselt, Chicago, Ill., assignor to American Steel Foundries, Chicago, Ill., a corporation of New Jersey Application September 17, 1931, Serial No. 563,282

19 Claims. (Cl. 188—56)

The present invention relates to brake rigging, and more particularly to brake rigging for clasp brakes, or the like.

Among the objects of the present invention is to provide a novel brake rigging, and more particularly a brake rigging for clasp brakes, or the like, particularly designed to provide for clearance for a motor or other power means associated with a railway car truck, and wheel and axle assemblies therefor.

The invention, therefore, contemplates the idea of so locating the various elements of the rigging, i. e., between the car truck and wheels of the wheel and axle assemblies of the present embodiment, whereby this proper clearance is effected, yet at the same time providing a substantial arrangement for the equalized application of braking forces to the wheels.

Another object within the purview of the present invention is to provide a novel brake rigging assembly including brake beams disposed on each side of the wheel and axle assemblies for the car truck, the beams having truck levers associated therewith and a plurality of which are suitably supported on certain of these brake beams.

The invention further comprehends the idea of positioning pairs of these truck levers between the axles of these wheel and axle assemblies and in juxtaposition to the wheels thereof, the same being associated with the brake beams and in a position to effectively provide for the above indicated clearance. In an embodiment selected to illustrate the invention, certain of the levers of these pairs are shown as being mounted upon the journal end portions of the inner of the brake beams, thereby resulting in a compact and neat design, the parts of which are readily and easily operated for applying an equalized braking force to the wheels, yet providing for a commodious space for a power means, such as a motor for the truck and associated wheel and axle assemblies.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a fragmentary top plan view of a railway car truck incorporating brake rigging made in accordance with the present invention;

Figure 2 is a view in side elevation of the car truck and brake rigging disclosed in Figure 1 of the drawings;

Figure 3 is a fragmentary view in vertical cross section taken in the plane represented by line 3—3 of Figure 1 of the drawings;

Figure 4 is a fragmentary view in end elevation of the left hand end of the truck and brake rigging shown in Figure 1 of the drawings; and Figure 5 is a fragmentary view in end elevation of the right hand end of the truck and brake rigging shown in Figure 1 of the drawings.

Referring now more in detail to the drawings, a brake rigging made in accordance with the present invention is shown associated with a railway car truck assembly including a main frame 2 supported, as by means of the side frame members or equalizers 4, upon journal boxes (not disclosed) journaled on the ends of axles of spaced wheel and axle assemblies 5 and 7, these boxes being embraced by the pedestal jaws 6 of the main frame. These pedestal jaws are tied together by the tie bars 8 for properly positioning the main frame and limiting movement of the journal boxes between the jaws 6.

The present brake rigging is shown as including outer or outside brake beams 10 and 12 and the inner or inside brake beams 14 and 16 disposed on each side of the wheel and axle assemblies 5 and 7, and having the brake heads 18 and 20, and 22 and 24 mounted upon or adjacent the ends thereof, respectively, these brake heads carrying brake shoes, such as the shoe 26, for applying a braking force to both sides of the wheels of the wheel and axle assemblies. The brake beams 10 and 12 are of similar construction and are movably hung or suspended from the main frame by means of the hangers 28 and 30, respectively. Similarly, the brake beams 14 and 16 are of similar construction and are hung from the main frame by the brake hangers 32 and 34, pivotally mounted in the brackets 36 and 38, respectively, while these brake beams are intermediately hung or suspended by means of the balance hangers 40 and 42 pivotally mounted in the brackets 44 and 46, these hangers each being disposed in alignment with its associated hanger and movable in a plane passing therethrough.

Connected to each of the brake beams 10 is a pull rod 48 which is guided in a U-shaped end portion 50 of a bracket 52 suitably connected, as by means of the bolts, or the like 54, to the tie bar 8 connecting the pedestal jaws 6 of the main frame 2, this pull rod being pivoted, as at 56, to the lower end of a dead truck lever 58 having its upper end pivoted, as at 60, in a bracket 62 integral with the main truck frame 2. The guide portion 50 will also act as a support for pull rod 48 in an emergency.

Each of the brake heads 20 carried by the outside brake beam 12 has a similar pull rod 64 connected thereto and which is likewise supported on and guided in the U-shaped portion 50 of a bracket 52 connected to the oppositely disposed tie bar 8 of the main frame 2, this pull rod 64 being pivotally connected, as at 66, to the lower end of a live truck lever 68.

Each of the inner or inside brake beams 14 and 16 is formed with journal end portions 70, as clearly disclosed in Figure 3 of the drawings, each journal end portion of the brake beams 14 and 16 being adapted to receive live truck levers 72 and 74, respectively, these truck levers 72 and 74 being interconnected at their upper ends by means of the pull rod 76. The truck levers 58 and 72, and 74 and 68, are respectively interconnected by links 78 and 80, whereby movement of the live truck lever 68 is transferred or transmitted in tandem through the levers 74, 72 and 58 for effecting movement of the brake beams associated therewith for movement of the brake members connected thereto for application of an equalized braking force to each side of the wheels of the wheel and axle assemblies.

Movement of the brake levers 68 disclosed on each side of the car truck frame 2 is effected through the medium of pull rods 82 pivotally connected, as at 84, adjacent each end of a cross equalizer or radius bar 86, movement of this equalizer or bar being effected through any desirable brake mechanism. The rods 82 interconnecting the equalizer with the brake levers 68 are supported upon rollers 88 and guided in the brackets 90 in which the rollers 88 are mounted. Movement of the equalizer or radius bar upon the main frame 2 is limited by the radius bar guides 92 connected in any suitable manner, as shown, to brackets 94 on the main frame. The coil springs 96 mounted upon the rods 98 and 99, secured respectively to the bracket 90 and the equalizer or radius bar 86, serve to release the brake mechanism.

From the above disclosure, it will be quite apparent that the truck levers of the brake rigging and the various brake elements connected or associated therewith are disposed between the car truck frame 2 and the wheels of the wheel and axle assemblies, while the truck levers themselves are disposed in pairs adjacent and in juxtaposition to the wheels of the wheel and axle assemblies and between the axles thereof so as to provide a compact arrangement whereby a proper and commodious space will be provided for a power means or motor for operation of the railway car.

While I have herein described and upon the drawings shown an illustrated embodiment of the invention, it is to be understood that the invention is not limited thereto but may comprehend other constructions, arrangements of parts, details and features without departing from the spirit of the invention.

I claim:

1. In a brake rigging for a railway car, the combination of truck levers disposed on opposite sides of said car, an equalizing member for said levers, members interconnecting said levers with said equalizing member, brackets including rollers for guiding said last-named members during movement, and resilient means interposed between said brackets and equalizing member for release of said brake mechanism.

2. In a brake rigging for a railway car, the combination of a car truck having spaced wheel and axle assemblies associated therewith, inner and outer brake beams for said assemblies, brake hangers supporting said brake beams on said truck, the inner brake beams being pivotally supported at an intermediate point in the plane of the brake hangers by balance hangers pivotally connected to the truck frame.

3. In a brake rigging for a railway car, the combination of a car truck having spaced wheel and axle assemblies associated therewith, brake beams applied to both sides of each pair of wheels, a truck lever for each brake beam, said levers being arranged in pairs, one lever of one of said pairs being a dead lever pivotally suspended from the truck frame, a radius bar for operating said brake rigging, a pull rod connecting said radius bar and the corresponding lever of the other pair, said corresponding lever being a live lever pivotally supported and guided by said last named pull rod, and means for supporting and guiding the lever end of said last named pull rod.

4. In a brake rigging for a railway car, the combination of a car truck having spaced wheel and axle assemblies associated therewith, brake hangers supporting said brake beams on said truck, a truck lever for each brake beam, said levers being arranged in pairs, the inside brake beams being pivotally connected at their ends to one of said levers of each pair and also being pivotally supported at an intermediate point in a plane of the brake hangers, one lever of one of said pairs being a dead lever pivotally suspended from the truck frame and the corresponding lever of the other pair being a live lever pivotally supported from a pull rod.

5. In a brake rigging for a railway car, the combination of truck levers disposed on opposite sides of said car, an equalizing member for said levers, members interconnecting said levers with said equalizing member, brackets including rollers for supporting and guiding said last-named members and said levers during movement, and resilient means interposed between said brackets and equalizing member for release of said mechanism.

6. In a brake arrangement, the combination of a truck frame including a side frame, spaced wheel and axle assemblies supporting said truck frame, brake beams disposed on each side of each wheel, brake heads rigidly secured to said beams and adapted for braking relation with said wheels, brake hangers and substantially co-planar balance hangers supporting said brake beams from said truck frame, a pair of vertically arranged levers disposed adjacent the inner of each of said brake beams and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivoted to the inner brake beams, a connection between said last named levers, a connection between said dead lever and the corresponding lever of the other pair with the adjacent outer brake beams, guide and safety means embracing said last named connection and supported from said side frame, and means for operating said brake arrangement.

7. In a brake arrangement, the combination of a truck frame including a side frame, spaced wheel and axle assemblies supporting said truck frame, brake beams disposed on each side of each wheel, brake heads rigidly secured to said beams and adapted for braking relation with said wheels, brake hangers and substantially co-planar balance hangers supporting said brake beams from said truck frame, a pair of vertically arranged levers disposed adjacent the inner of each of said brake beams and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivoted to the inner brake beams, a connection between said last named levers, a connection between said dead lever and the corresponding lever of the other pair with the adjacent outer brake beams, guide and safety means embracing said last named connection and supported from said side frame, means for operating said brake arrangement, said means including an equalizer bar connected to said corresponding lever, and release means connected to said equalizer bar and to said side frame.

8. In a brake arrangement, the combination of a truck frame including a side frame, spaced wheel and axle assemblies supporting said truck frame, brake beams disposed on each side of each wheel, brake heads secured to said beams and adapted for braking relation with said wheels, brake hangers and substantially co-planar balance hangers supporting said brake beams from said truck frame, a pair of vertically arranged levers disposed adjacent the inner of each of said brake beams and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivoted to the inner brake beams, a connection between said last named levers, a connection between said dead lever and the corresponding lever of the other pair with the adjacent outer brake beams, guide and safety means embracing said last named connection and supported from said side frame, and means for operating said brake arrangement.

9. In a brake arrangement, the combination of a truck frame including a side frame, spaced wheel and axle assemblies supporting said truck frame, brake beams disposed on each side of each wheel, brake heads secured to said beams and adapted for braking relation with said wheels, brake hangers and substantially co-planar balance hangers supporting said brake beams from said truck frame, a pair of vertically arranged levers disposed adjacent the inner of each of said brake beams and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivoted to the inner brake beams, a connection between said last named levers, a connection between said dead lever and the corresponding lever of the other pair with the adjacent outer brake beams, guide and safety means embracing said last named connection and supported from said side frame, means for operating said brake arrangement, said means including an equalizer bar connected to said corresponding lever, and release means connected to said equalized bar and to said side frame.

10. In a brake arrangement, the combination of a truck frame including a side frame, spaced wheel and axle assemblies supporting said truck frame, brake rigging adapted for braking relation with said wheels, means for operating said brake rigging including an equalizer bar supported on said truck frame, a pull rod connecting said equalizer bar to said brake rigging, a bracket secured to said truck frame and provided with means for anti-frictionally supporting said pull rod, and release means secured to said bracket and to said equalizer bar.

11. A supporting bracket for brake rigging including a body portion provided with an anti-friction roller, and means for securing release rigging thereto.

12. A bracket for supporting brake rigging including a body portion adapted to be secured to a truck frame, means provided on said body portion for anti-frictionally supporting associated brake rigging, and a flange extending substantially normally to said body portion and provided with means for securing release rigging thereto.

13. In a brake arrangement, the combination of a truck frame including a side frame, spaced wheel and axle assemblies supporting said truck frame, brake beams disposed on each side of each wheel, brake heads secured to said beams and adapted for braking relation with said wheels, brake hangers and substantially co-planar balance hangers supporting said brake beams from said truck frame, a pair of vertically arranged levers disposed adjacent the inner of each of said brake beams and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivoted to the inner brake beams, a connection between said last named levers, a connection between said dead lever and the corresponding lever of the other pair with the adjacent outer brake beams, guide and safety means embracing said last named connection and supported from said side frame, and means for operating said brake arrangement, said last named means including an equalizer bar and a pull rod connecting said corresponding lever and equalizer bar, and guide and supporting means for said last named pull rod carried by said side frame.

14. In a brake arrangement, the combination of a truck frame including a side frame, spaced wheel and axle assemblies supporting said truck frame, brake beams disposed on each side of each wheel, brake heads secured to said beams and adapted for braking relation with said wheels, brake hangers and substantially co-planar balance hangers supporting said brake beams from said truck frame, a pair of vertically arranged levers disposed adjacent the inner of each of said brake beams and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivoted to the inner brake beams, a connection between said last named levers, a connection between said dead lever and the corresponding lever of the other pair with the adjacent outer brake beams, guide and safety means embracing said last named connection and supported from said side frame, and means for operating said brake arrangement, said last named means including an equalizer bar and a pull rod connecting said corresponding lever and equalizer bar, and guide and supporting means for said last named pull rod carried by said side frame, and release means connected to said equalizer bar and said guide and supporting means.

15. In a brake arrangement, the combination of a truck frame including a side frame, spaced wheel and axle assemblies supporting said truck frame, brake heads disposed on each side of said wheels and adapted for braking relation with said wheels, brake hangers supporting said brake heads on said side frames, a pair of vertically arranged levers disposed adjacent the inner of each of said brake heads and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivotally connected to the inner brake heads, a connection between said last named levers, a connection between said dead lever and the corresponding lever of the other pair with the adjacent outer brake heads, and means for operating said brake arrangement, said means including an equalizer bar connected to said corresponding lever by a pull rod, and guide and supporting means for said last named pull rod carried by said side frame and engaging said pull rod, and release means connected to said equalizer bar and to said guide and supporting means.

16. In a brake arrangement, the combination of a truck frame including a side frame, spaced wheel and axle assemblies supporting said truck frame, brake heads disposed on each side of said wheels and adapted for braking relation with said wheels, brake hangers supporting said brake heads on said side frames, a pair of vertically arranged levers disposed adjacent the inner of each of said brake heads and between said wheels and said side frame, a connection between each of said levers of each of said pairs, said connection being intermediate the ends thereof, one of the levers of one of the pairs being a dead lever, the corresponding lever of the other pair being a live lever, the other of the levers of each of said pairs being pivotally connected to the inner brake heads, a connection between said last named levers, a connection between said dead lever and the corresponding lever of the other pair with the adjacent outer brake heads, guide and safety means embracing said last named connection and supported from said side frame, and means for operating said brake arrangement, said last named means including an equalizer bar and a pull rod connecting said corresponding lever and equalizer bar, and guide and supporting means for said last named pull rod carried by said side frame and engaging said pull rod, and release means connected to said equalizer bar and said guide and supporting means.

17. In a brake arrangement, the combination of a truck frame including a side frame, spaced wheel and axle assemblies supporting said truck frame, brake rigging adapted for braking relation with said wheels, means for operating said brake rigging including an equalizer bar supported on said truck frame, a pull rod connecting said equalizer bar to said brake rigging, a bracket secured to said truck frame for supporting said pull rod, and release means secured to said bracket and to said equalizer bar.

18. In a brake rigging for a railway car, the combination of a car truck having spaced wheel and axle assemblies associated therewith, brake beams applied to both sides of each pair of wheels, a truck lever for each brake beam, said levers being arranged in pairs and on one side of the adjacent axles, one lever of one of said pairs being a dead lever pivotally suspended from the truck frame, a radius bar for operating said brake rigging, a pull rod connecting said radius bar and the corresponding lever of the other pair, said corresponding lever being a live lever pivotally supported and guided by said last named pull rod, and means for supporting and guiding the lever end of said last named pull rod.

19. In a brake rigging for a railway car, the combination of a car truck having spaced wheel and axle assemblies associated therewith, brake beams applied to both sides of each pair of wheels, a truck lever for each brake beam, said levers being arranged in pairs and on the inside of the adjacent axles, one lever of one of said pairs being a dead lever pivotally suspended from the truck frame, a radius bar for operating said brake rigging, a pull rod connecting said radius bar and the corresponding lever of the other pair, said corresponding lever being a live lever pivotally supported and guided by said last named pull rod, and means for supporting and guiding the lever end of said last named pull rod.

WALTER H. BASELT.